United States Patent
Hubble (10) Patent No.: US 9,119,068 B1
(45) Date of Patent: Aug. 25, 2015

(54) AUTHENTICATION USING GEOGRAPHIC LOCATION AND PHYSICAL GESTURES

(71) Applicant: Jeremy Hubble, Sunnyvale, CA (US)

(72) Inventor: Jeremy Hubble, Sunnyvale, CA (US)

(73) Assignee: Trend Micro Inc., Tokyo (JP)

( * ) Notice: Subject to any disclaimer, the term of this patent is extended or adjusted under 35 U.S.C. 154(b) by 0 days.

(21) Appl. No.: 13/737,825

(22) Filed: Jan. 9, 2013

(51) Int. Cl.
- H04W 12/06 (2009.01)
- H04W 4/02 (2009.01)
- H04W 88/02 (2009.01)

(52) U.S. Cl.
CPC .............. *H04W 12/06* (2013.01); *H04W 4/027* (2013.01); *H04W 88/02* (2013.01)

(58) Field of Classification Search
CPC .................. G06F 3/017; G06F 1/1694; G06F 2200/1637; G06F 3/0346; G06F 3/03; G06F 21/00; G06F 21/31; G06F 2221/2111; H04M 2250/12; H04M 1/72577; H04M 1/72572; H04M 1/66; A63F 2300/105; H04W 48/04; H04W 4/027; H04W 12/06; H04W 4/02; H04W 12/08; H04W 12/10; H04W 48/02; H04W 4/021
USPC .............. 455/411, 410, 418, 456.1–457, 565, 455/567; 380/247, 249, 250; 726/2, 16–17, 726/26–30, 35
See application file for complete search history.

(56) References Cited

U.S. PATENT DOCUMENTS

| | | | |
|---|---|---|---|
| 7,000,116 B2* | 2/2006 | Bates et al. .................... | 713/182 |
| 7,945,586 B1* | 5/2011 | Fang et al. .................... | 707/785 |
| 8,302,152 B1* | 10/2012 | Hewinson ....................... | 726/1 |
| 8,638,939 B1* | 1/2014 | Casey et al. .................... | 380/277 |
| 2006/0166620 A1* | 7/2006 | Sorensen ..................... | 455/41.1 |
| 2007/0101438 A1* | 5/2007 | Govindarajan ................ | 726/27 |
| 2009/0265671 A1* | 10/2009 | Sachs et al. .................... | 715/863 |
| 2011/0163955 A1* | 7/2011 | Nasiri et al. .................. | 345/158 |
| 2013/0023290 A1* | 1/2013 | Rofougaran et al. ....... | 455/456.3 |
| 2013/0024932 A1* | 1/2013 | Toebes et al. .................... | 726/19 |
| 2013/0160088 A1* | 6/2013 | McFarland ....................... | 726/4 |
| 2013/0167221 A1* | 6/2013 | Vukoszavlyev et al. ........ | 726/16 |
| 2014/0125574 A1* | 5/2014 | Scavezze et al. ............. | 345/156 |

* cited by examiner

*Primary Examiner* — George Eng
*Assistant Examiner* — Umair Ahsan
(74) *Attorney, Agent, or Firm* — Beyer Law Group LLP (57) ABSTRACT

A gesture with a mobile device by the user is required for authorized access to the mobile device. An activating motion is performed to trigger authentication mode. Sensors detect the current geographic location of the device and a gesture performed by the user. Geographic location and a gesture are matched against stored data. Optionally, the detected data may fall within a tolerance range for both the geographic location and a gesture to be authorized access. Various techniques to permit different access levels are implemented based upon the type of gesture performed or the location where performed. During authentication setup a performed gesture at a particular geographic location is stored in the device. Performance of the same gesture multiple times allows for tolerance ranges to be established.

10 Claims, 7 Drawing Sheets

FIG. 1

FIG. 2 Mobile Device Block Diagram

FIG. 4 Coordinate System

AUTHENTICATION USING GEOGRAPHIC LOCATION AND PHYSICAL GESTURES

FIELD OF THE INVENTION

The present invention relates generally to authentication of a mobile device. More specifically, the present invention relates to authentication using a gesture with the mobile device.

BACKGROUND OF THE INVENTION

Accessible data on mobile devices provides convenience but increases problems associated with data loss. Lost data may be detrimental to the owner of the data if the mobile device allows non-permissible access. There are numerous methods by which non-permissible access may occur, such as, an authorized employee accessing confidential information of the company, a stranger acquiring sensitive personal data from the lost mobile device, or other instances. Though employees may be more productive with unrestricted access to company data on their mobile devices at any given location, an increased risk of losing data on the mobile device outside of secured locations is apparent. If lost data were in the possession of anyone without proper authorization, irreparable harm may occur because a competitor or individual may use confidential or any information to their advantage. The unauthorized access could possibly lead to trade secret exposure, identity theft, or similar adverse situations.

Methods to authenticate mobile devices are currently limited, such as by matching a dot pattern, a thumbprint, an image or a sound pattern, or by entering a correct password. Authenticating a user's identity on mobile devices may be challenging or rather sluggish with these limited methods. For example, a user may be required to remove their non-capacitive gloves to submit authentication via touch screen. Otherwise, the user is unable to input their password or select a virtual button to capture an image during authentication mode. Further, the traditional techniques that are available to authenticate oneself may be time consuming if the individual has forgotten their password.

It would be desirable to find an improved technique that is able to rapidly and conveniently authenticate mobile devices.

SUMMARY OF THE INVENTION

To achieve the foregoing, and in accordance with the purpose of the present invention, a mobile device security method is disclosed to protect a device against unauthorized access yet allow rapid authentication.

Current software applications used to secure mobile devices from unauthorized access make legitimate access difficult while often not providing an adequate level of security. Though common authentication methods include typing a password on a screen, moving an object to a certain location on a screen, connecting dots in a certain pattern, and matching fingerprints, all of these methods do not allow a user to provide authentication without touching the screen. By contrast, the present invention permits the user to easily authenticate himself or herself with a gesture. Furthermore, the invention maintains a high level of security to prevent unauthorized access to the mobile device. For example, the mobile device may be required to be at a particular geographic location in order for authentication to be successful. A variety of access levels may be created by the owner of the mobile device for added security.

In a first embodiment, authentication setup is performed. The user performs a gesture with the mobile device and this gesture is stored for future authentication within persistent storage of the mobile device. Optionally, the geographic location where the gesture is performed is also recorded and stored in association with the gesture. The user may be prompted to perform the same gesture multiple times, in which case data from these multiple gestures is averaged or combined in some fashion in order to produce a single set of data describing the gesture.

In this first embodiment, multiple gestures can be used to set up a tolerance range for the user. Sensors on the mobile device are used to detect the multiple movements. After the user conducts the multiple gestures, the movements are combined into a tolerance range. Multiple gesture performances may be used to configure the tolerance range as it may vary depending upon the user and device. A geographic location tolerance range for the mobile device may be configured by the user as well. Thus, in the case of multiple gestures, the method may also determine a tolerance range for performance of the gesture depending upon the variation in performing the gesture by the user. Any such tolerance range is also stored in association with the stored gesture.

In a second embodiment, a user performs an activating motion with the mobile device in order to initiate authentication mode. Feedback is provided to the user once an activating motion is detected. If the user's gesture performance fails to match the stored gesture data within a gesture tolerance range, then authentication fails. Optionally, the current geographic location of the mobile device must match the stored geographic location data within a geographic location tolerance range for the device to be authenticated. Authentication of the user permits access to the device, to any of its applications, or to a particular level of security.

In a third embodiment, the geographic location of the mobile device is first determined and is used as a key into a database of stored gestures. If the gesture stored at the location identified by the geographic location matches the gesture performed by the user, then authentication is successful. There may be different gestures stored in association with a particular geographic location in order to provide different types of access depending upon the gesture performed.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Securing various levels of access to a mobile device uses sensors on the device, which may be the accelerometer, compass, and global positioning system (GPS), to detect geographic location and gestures. Secure access may be any type of restriction on the mobile device to allow deployment of specific applications or data access of the mobile device. The secure access helps prevent unauthorized use of the mobile device, including situations such as, losing the device, theft, an employee unauthorized to use confidential information, and any other situation where a user does not have permission of the owner. Mobile devices include mobile telephones, tablet computers, laptop computers, or any other mobile device that contains these sensors which possess the ability to secure access. If the sensors do not detect a matching gesture, then authentication is not received and access will be denied in order to secure the mobile device from unauthorized access. However, the access can be permitted once authentication is received.

Figure 1:
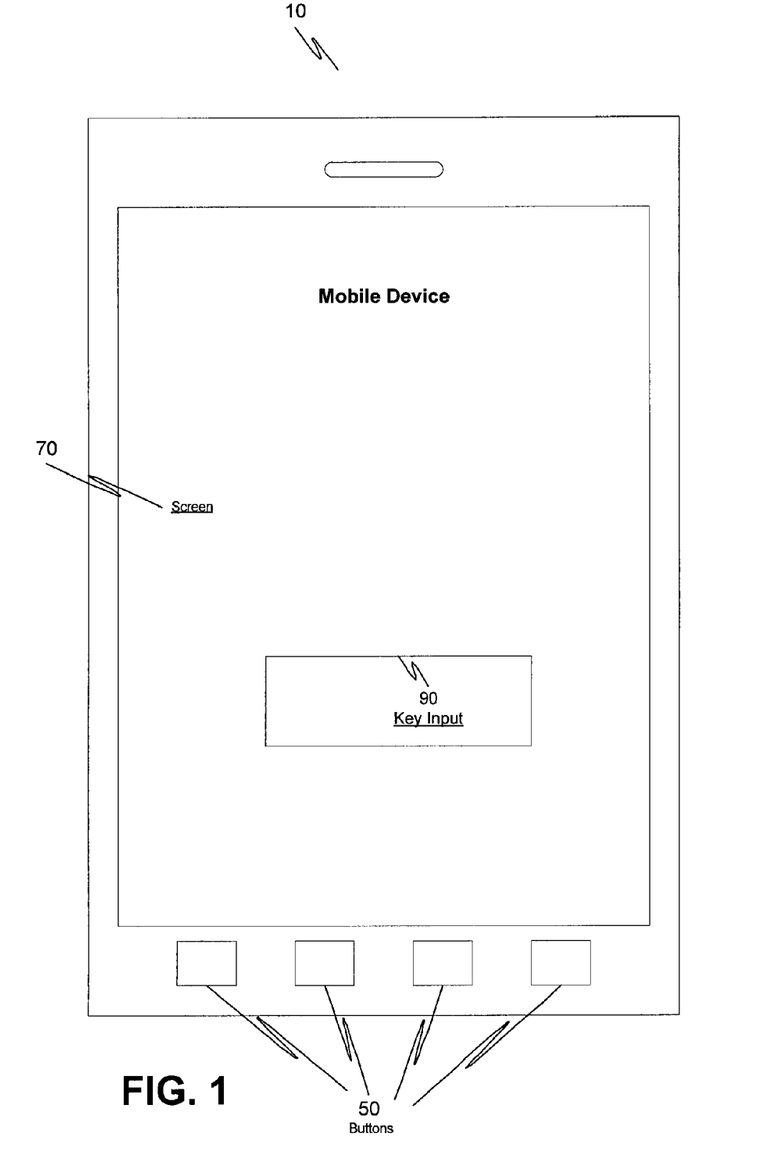
FIG. 1 is a block diagram of a mobile device (such as a mobile telephone, tablet computer, or any other mobile device) that contains a variety of sensors.

FIG. 1 is a block diagram of a mobile device, such as a mobile telephone, tablet computer, or any other mobile device, containing a variety of input regions. A mobile device 10 is shown as having buttons 50, a screen 70, and key input region 90, as well as other known features.

Buttons 50 are known in the art and may be any of a variety of physical buttons present on the mobile device (such as on its face or side) including dedicated characters or symbols or so-called "soft keys" that may be used for different purposes. The screen 70 of the mobile device may be a display screen or it may also be a touchscreen that allows for input directly on the screen itself as known in the art. Key input region 90 on a touchscreen may be used by the user to enter characters, symbols, or numbers, as is known in the art.

Figure 2:
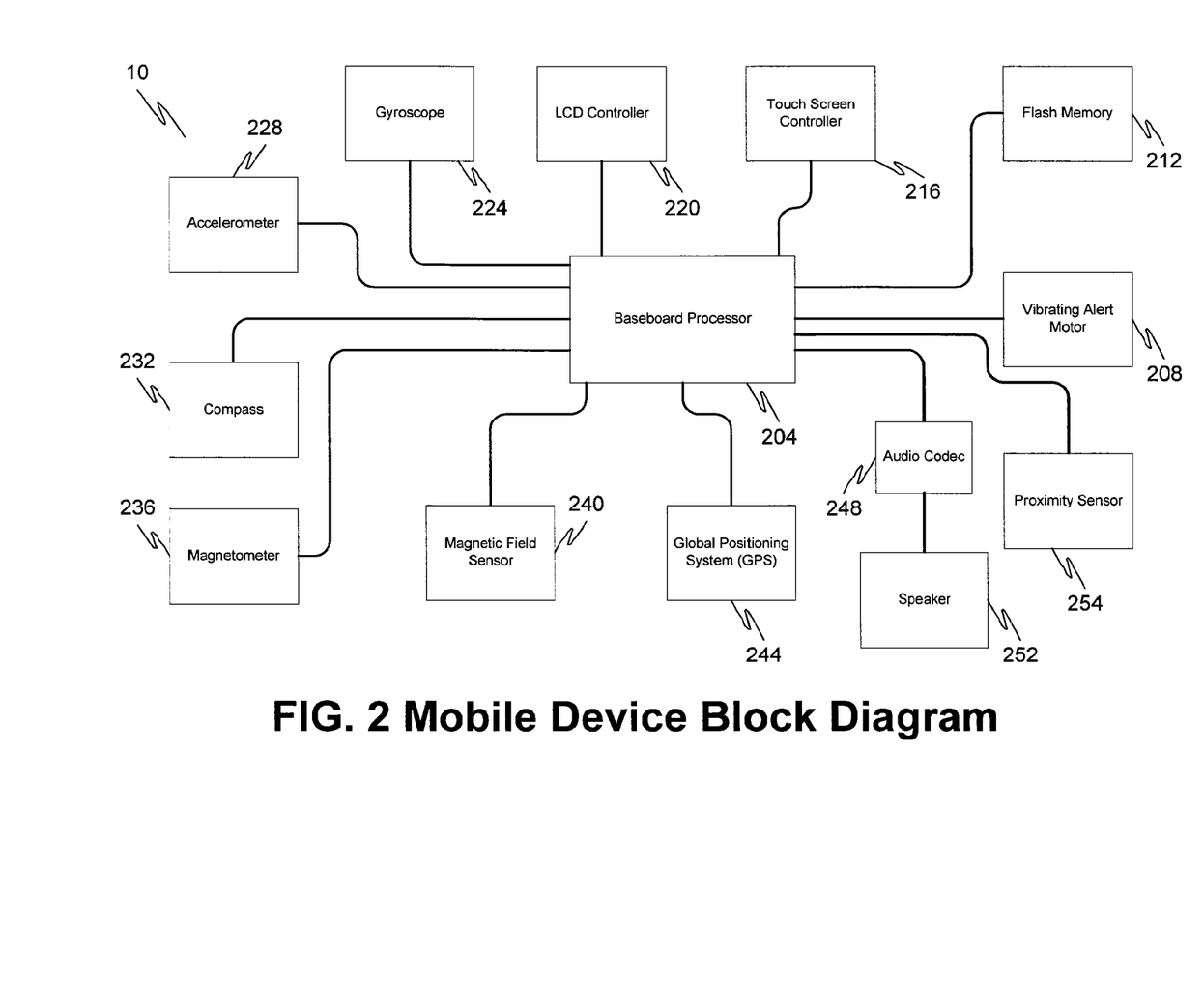
FIG. 2 is a block diagram of a mobile device containing components which a mobile device uses for authentication.

FIG. 2 is a block diagram of a mobile device containing a variety of components used to: detect movement and location; provide notification through vibration, sound, or display; store information; and provide the general functionality of the mobile device. A mobile device 10 is shown as having internal components known in the art such as a baseboard processor 204, vibrating alert motor 208, flash memory 212, touch screen controller 216, LCD controller 220, gyroscope 224, accelerometer 228, compass 232, magnetometer 236, magnetic field sensor 240, global positioning system (GPS) 244, audio codec 248, speaker 252, proximity sensor 254, as well as other known features used to provide the functionality of a mobile telephone.

Baseboard processor 204 is used to control all functions on the mobile device including the commands to detect movement or location by sensors. The vibrating alert motor 208 produces vibration on the mobile device which may be used to alert the user. Flash memory 212 contains data that may be stored by the user such as settings of the device, sensitive data, or location and gesture data for authentication. Touch screen controller 216 may consist of resistive or capacitive control to determine received input from the touchscreen. LCD controller 220 may be used to control the screen 70 to display images. A gyroscope 224 is used to measure orientation and rotation in a three-dimensional manner about a vertical axis, a longitudinal axis, and a lateral axis of the mobile device. An accelerometer 228 detects movement and acceleration with respect to the three-dimensional axes as mentioned above. Other components may be used to detect movement of the mobile device in three-dimensional space.

While the above components detect movement in three-dimensional space, a variety of other components may be used to measure movement of the mobile device about a single axis. For example, the compass 232 measures degrees of rotation about the vertical axis. While compass information concerning degrees of rotation about the vertical axis can be redundant with data from the gyroscope and accelerometer, often the compass information may be more accurate and may be used in certain embodiments. A magnetometer 236 determines changes in the magnetic field to identify different gestures in three-dimensional space. The compass readings are most commonly obtained by processing data from the magnetometer. The raw magnetometer data is the most common means of currently providing the compass information. This data may also be used to provide additional gesture information based on magnetic interference along three axes. Magnetic field sensor 240 is used to track changes in the magnetic field to determine direction.

Global positioning system (GPS) 244 determines location by using a satellite navigation system with an accuracy of about one meter. Crude location can also be determined via a wireless network IP address of the network to which a mobile device is connected. The triangulation of signals from the cell-towers to which a mobile device is connected can also provide location information. The different positioning systems may be used together to provide a more accurate location.

Other sensors may be useful in augmenting this sensor information. Barometers and altimeters can provide more accurate altitude readings. This will help a device to more rapidly obtain a fix on the GPS location. These sensors can also be used to accurately pinpoint the location vertically. This could be useful in identifying the correct floor in a multi-story building or other change in elevation of the device.

A proximity sensor 254 may also be used in order to determine the proximity of objects to the mobile device without requiring contact. This is commonly used to determine the proximity of a person's face to a phone. If the "object" is close to the telephone, then the display and touch operations can be disabled. Most implementations of proximity sensors only expose a Boolean value to indicate whether an object is near.

Lastly, an audio codec 248 may decode digital signals into analog audio output so that the mobile device may emit sounds. A speaker 252 may be used to produce sounds after decoding audio with the audio codec 248.

In addition to the above hardware components, the mobile device includes operating system software and other applications stored in persistent storage and executed in volatile memory of the device. This software may also be used to determine a location of the mobile device. For example, when the mobile device is part of a telecommunications network (such as a cell telephone network) a cell network triangulation technique may be used to determine the device's location based upon its position relative to two or more cell towers. The mobile device will also include other software, such as an applications programming interface (API) for each component, in order to command the accelerometer (for example) to begin recording data or to output data that the accelerometer has recorded during a particular time frame.

AUTHENTICATION SETUP

Figure 3:
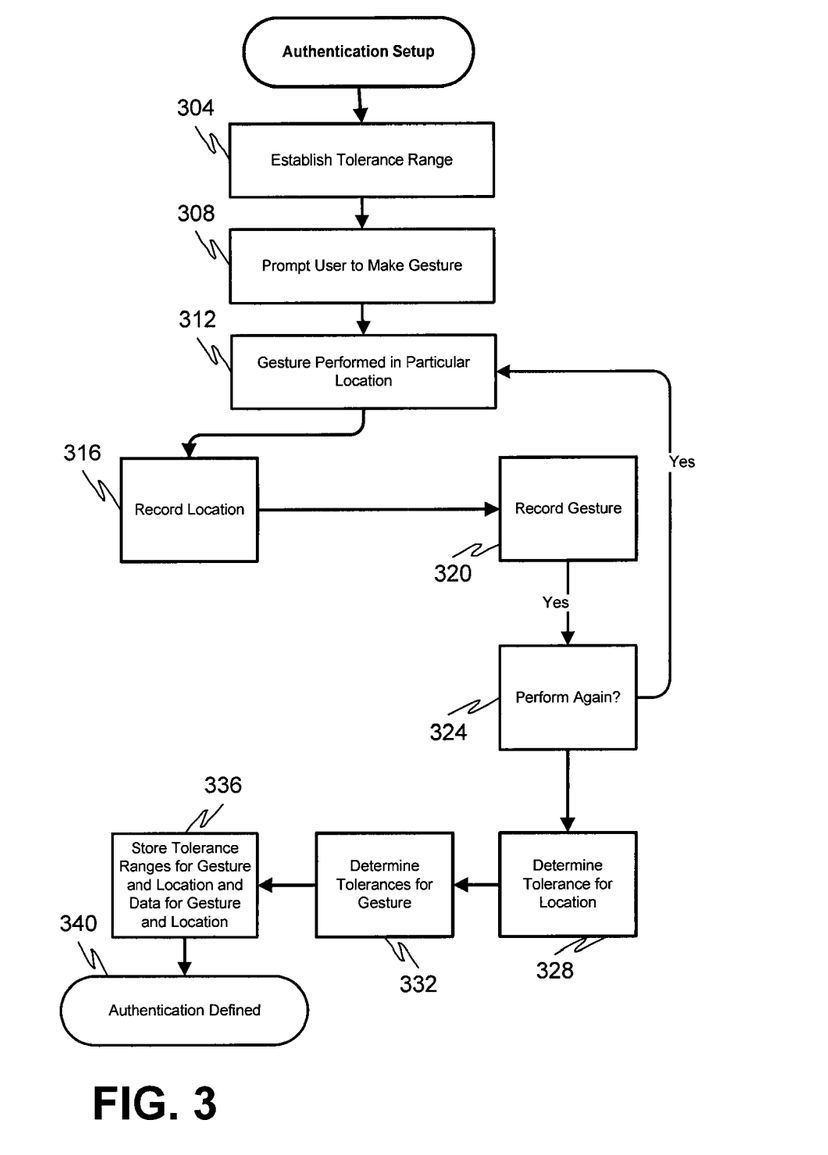
FIG. 3 is a flow diagram describing a process by which a mobile device performs authentication setup.

FIG. 3 is a flow diagram describing a process by which a mobile device sets up authentication.

At step 304 the mobile device establishes any tolerance ranges input by the user or by an application by selecting predefined default values. Establishing any tolerance ranges in this step is optional as the method may instead automatically determine tolerances for location and gestures in step 328 and 332 below. And, while some measurements for location or gestures may include tolerances, others may not. Tolerances may be established (or determined) for a variety of measurements. For example, a tolerance may be established for the location of the mobile device, for an angle to which the device is rotated or tilted, for the number of seconds the device is held in a particular position, for how fast the device is rotated or tilted, etc. Of course, the tolerances for movement may include a tolerance for each of the three dimensions.

Examples of tolerance ranges include the following: a user selecting a gesture default tolerance by accepting all gestures within a tolerance of 20° degrees; measuring all rotations of the mobile device in a time frame of no more than about 3 seconds; measuring the end point of a rotational angle in degrees after movement is completed within no more than about 2 seconds; stopping recording of data relating to a gesture when the mobile device detects no movement by the user in about 2 seconds; discontinuing recording gestures once the device returns to the initial position of the gesture; establishing a tolerance range for the speed or acceleration at which the mobile device is moved, etc. In an embodiment in which the gesture performed with the mobile device is simply rotating it or tilting it a number of degrees, a default tolerance range may be established for the angle to which the device is rotated or tilted. As for location, a default tolerance range may be selected or established indicating that the mobile device must be within about fifteen feet of a recorded location (such as an office) or within about 25 yards of a recorded location (such as a building's location). In one specific example, a location tolerance may be selected by a user to be no more than about 1 meter.

As mentioned, these tolerance ranges may be selected by the user, established by an application program, or may be default values present within the authentication application software.

In one embodiment, the mobile device will prompt the user to perform a gesture or gestures in step 308 by sound notification with a speaker 252. However, the mobile device may prompt the user by vibration with a vibrating alert motor 208 or by a message displayed on the screen 70 to begin performing a gesture or gestures. The user may be instructed to perform a gesture for a number of seconds (e.g., about two seconds), may be instructed to rotate or tilt the device through one angle only, or may be instructed to perform any number of gestures with the understanding that recordation of the gestures will cease when the device remains motionless for about two seconds (for example).

In one embodiment, the mobile device prompts the user to perform a gesture when the mobile device is held more or less face up and level, and pointing in any direction. This orientation establishes a simple baseline from which a gesture may be recorded and performed for authentication in the future. The authentication application may inform the user of any other desirable orientation for beginning the gesture. Of course, it is not strictly necessary that the mobile device begin at a particular orientation, as any type of gesture may be performed based upon an initial starting orientation of the mobile device (e.g., the device is raised or lowered rapidly regardless of the exact orientation of the device). Following performance of the gesture, the user may be prompted by sound notification with a speaker 252 (or using any other output of the mobile device) to signify that gesture recording is completed.

Then, at step 312, the gesture or gestures are performed at a particular geographic location by the user and stored for use as secure access data for later authentication. Examples of gestures include the following: when held face up the mobile device may be tilted a certain number of degrees and then returned to its original position; the device may be rotated within a horizontal plane a certain number of degrees; the device may be raised or lowered (or both) quickly a certain distance; the device may be moved forward or backward or moved from side to side while held flat in the palm of a hand; a particular movement may be repeated a certain number of times. A secure gesture may involve a movement that is easily repeated by the user, but difficult for others to imitate. For instance, a musician may perform the motion to direct one of his favorite pieces of music. This will be easy for the musician to repeat precisely, but difficult for the uninitiated to imitate.

At step 316, the geographic location of the mobile device is recorded with the GPS 244 immediately before, during or immediately after performance of the gesture. Preferably, the location of the device is recorded in close time proximity to performance of the gesture in order to ensure that the gesture is being performed at a particular location. Of course, the location may also be recorded using another hardware sensor, or in software using cell network triangulation, the device's IP address, etc.

Gestures performed are recorded with the accelerometer 228, in one embodiment, at step 320. The gyroscope 224, compass 232, magnetometer 236, and magnetic field sensor 240 may also be used to detect and record gestures. These hardware components record movement data describing the gesture performed by the user for the number of seconds specified, for a single movement, or until the device remains motionless for a predetermined number of seconds, depending upon the embodiment.

Although it is possible that the gesture need only be performed once (in which case control moves to step 328), in one embodiment the user is prompted to perform the gesture multiple times in order to determine acceptable tolerance ranges for the gesture. If so, then the mobile device will prompt the user to perform the gesture or gestures again at step 324 by sound notification with a speaker 252 (or using other output) and control returns to step 312 for the same gesture performance at a particular location. Another sound notification with a speaker 252 will prompt the user on the mobile device that gesture performance is completed. Once steps 316 and 320 have been completed as mentioned above any number of times, control will move to step 328. The gesture data for the gesture performed multiple times will be recorded as separate instances of the gesture. Preferably, the user will be performing the same gesture (more or less) each time in order to train the mobile device as to the expected gesture.

A tolerance for location at step 328 may be determined on the mobile device. As stated previously, a location tolerance may be selected by a user above in step 304 or a default location tolerance may have been determined. In step 328 a tolerance for location is automatically determined based upon the recorded location or locations in step 316. For example, if a number of location measurements are taken, a tolerance may simply be the longest difference between any of these recorded locations, an average distance between the locations, a percentage of any distance between locations, or some other calculation that takes into account possible movement of the user while recording the same gesture multiple times. In one specific example, if the user is walking around his or her office while recording a gesture multiple times, the tolerance may be on the order of about ten feet. A tolerance may also automatically be determined based upon the inherent uncertainty reported with any GPS location. For example, if a GPS location is determined to be a particular value accurate to within about 30 feet, then a tolerance may be determined to be 30 feet or some percentage thereof.

Figure 4:
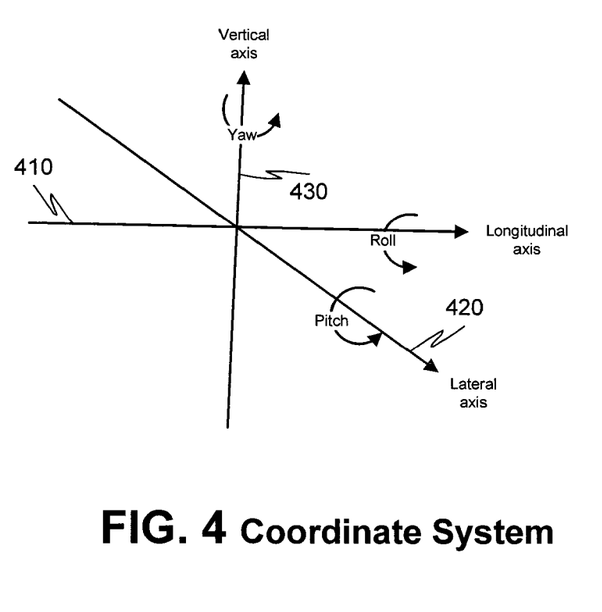
FIG. 4 illustrates a coordinate system that may be used by the sensors.

At step 332, tolerances for gestures may be automatically determined. As mentioned above, gesture tolerances may be determined by the user or by default in step 304, while in step 332 gesture tolerances are based upon the gesture being performed multiple times in step 320. If a range of degrees are input based on the accuracy of the user performing the gestures, then a tolerance based on the differences between the degrees performed from the gesture performances will be determined. For example, assuming the user is attempting to tilt the device to a 90 degree angle, after the user performs three gestures (for example) and the values of 90°, 60°, and 120° are detected, the device will calculate the difference between the highest (120° in this case) and the lowest value (60° in this situation) and a tolerance of 30 degrees (the difference divided in half) will be set as an accepted tolerance for authentication. Rotational degrees may be detected and captured in the predefined gesture in more than one direction using the vertical axis 430, longitudinal axis 410, and lateral axis 420, as shown in FIG. 4. If a gesture is detected about more than one axis, gesture tolerance ranges maybe recorded for all detected axes. As an example, assume the device is held upright at the initial position and the user tilts the device to the right at a 90° angle while flipping the device backwards at a 20° angle. If the user attempts to perform the same gesture again but tilts at a 98° angle and flips at a 22° angle, then in this situation, 10 degrees on the longitudinal axis and 5 degrees on the lateral axis can be recorded respectively as gesture tolerance ranges for these axes (assuming that the tolerance is a certain percentage of the difference between the measured values).

Next, data is permanently stored for later authentication in step 336 and includes the following: recorded data from the gesture or gestures in step 320; data from the gesture tolerance ranges determined in step 332; recorded data from the geographic location in step 316; and data from the geographic location tolerance range in step 328. For example, if the gesture is only performed once, then data associated with that gesture and its recorded geographic location are stored permanently on the mobile device. In another example, if the gesture had been performed three times and a tolerance range had been determined for that gesture, then only data associated with a single performance of that gesture need be stored along with any tolerance ranges. Or, the data associated with the three performances may be averaged or merged in some fashion to produce a single set of data for a single hypothetical performance. Only the single set of data need be stored along with any associated tolerance ranges. Similarly, if three different geographic locations had been recorded then only a single geographic location need be stored along with a tolerance. It is also possible to average or combine the multiple geographic locations in order to produce a single hypothetical geographic location for permanent storage on the mobile device. Data may be stored in encrypted form in one embodiment.

Authentication is thus defined and authentication setup is completed in step 340. Other levels of security may be created by the user and authentication setup may be repeated using additional gestures or various locations in order to authenticate the user to a different application on the mobile device, or to authenticate the user at a different level within a particular application. A variety of locations may be stored to provide different levels of secured access on the device while matching the same gesture performance, in another embodiment. For example, the user performing the same gesture in different locations may allow different types of access to the mobile device (e.g., access to different e-mail accounts, access to different levels of security within application, etc.). Multiple gestures may be recorded and stored for authentication, which requires the user to match the gestures according to specific locations created by the user in authentication setup. Higher levels of security may be configured to permit access if the location and gesture matches, however, other methods as known in the art (such as login and password, key input, matching a pattern, image recognition, and voice recognition) may be used in addition to establish increased security.

EXAMPLE COORDINATE SYSTEM

FIG. 4 illustrates a coordinate system that may be used by the sensors as shown in FIG. 2. Orientation and movement of the device in three dimensions is measured on three axes. The sensors on the mobile device that detect three-dimensional movement include the accelerometer 228 and gyroscope 224. The magnetometer can also return three-dimensional data to determine movement in a three dimensional space. Currently, the most common application of the magnetometer is via the processed compass data. While the compass 232 can only measure movement about a single axis (a rotation about the vertical axis 430), the compass can be used to provide more accurate information than the accelerometer as mentioned above.

The axes consist of the longitudinal axis 410, lateral axis 420, and vertical axis 430. A mobile telephone is used as an example but any mobile device may be used, including a tablet computer, laptop computer, or any other device containing the necessary sensors. An analogy with airplane movement may be useful for understanding orientation. If the longitudinal axis corresponds roughly to an airplane's fuselage, and the lateral axis corresponds to the wings, then it can be understood that a roll is when one wing dips to one side, a pitch is when the nose dips down, and yaw is when the airplane turns left or right. Accordingly, if a mobile telephone is held flat in the palm of a hand face up, then the top edge of the mobile telephone corresponds to an airplane's nose. A roll movement then is when a mobile telephone rotates in a left or right direction about its longitudinal axis 410 (i.e., the left or right edge is lifted up or down). Meanwhile, a pitch rotation is when the mobile telephone tilts up or down along the lateral axis 420. When the mobile phone is twisting side to side (remaining face up in its horizontal plane), a yaw rotation has been conducted about the vertical axis 430.

When the accelerometer 228, gyroscope 224, and compass 232 measure the orientation and movement of the mobile device during authentication setup and authentication mode, movement about (or along) at least one axis is measured, recorded, and stored during performance of these gestures. Of course, movement about (or along) multiple axes can be measured and recorded throughout these gesture performances as mentioned above. Additionally, other sensors are able to detect movement and orientation such as the magnetometer 236, magnetic field sensor 240, and any other sensors designed for motion detection. Although only one coordinate system and a set of conventions are shown in FIG. 4, one of skill in the art will appreciate that other coordinate systems may be used and different conventions may be established in order to measure movement of the mobile device in one, two or three dimensions. Also, even though a gesture may involve movement in three dimensions, the application may be configured to only record movement about a single axis or about two axes, or along only one or two axes.

In addition to orientation of the mobile device in three dimensions as described above, there is another possible component of a gesture that is termed a displacement. Using the airplane analogy, while an airplane might pitch, yaw or roll and thus change its orientation (without movement along an axis), the airplane might move forward or descend without any pitch, yaw or roll, thus affecting a displacement in three-dimensional space. Similarly, a mobile telephone held flat in the palm of a hand may be raised or lowered, moved forward or backward, or moved from side to side, all without registering any change in its orientation (pitch, yaw or roll). Displacement may also be measured using the coordinate system of FIG. 4. Considering a mobile device located at the intersection of the three axes, movement up or down is measured upon the vertical axis, movement from side to side as measured along the lateral axis, and movement forward or backward is measured along the longitudinal axis.

Accordingly, it is possible that a gesture might include changes in orientation or changes in displacement but not both. Or, the gesture might include both a change in orientation of the device and a change in the displacement of the device. And, as has been described above, a change in orientation may only be about a single axis, and a change in displacement may only be along a single axis. The accelerometer does a good job measuring displacement with regards to gravity, while the accelerometer and compass primarily measure orientation. The combined use of multiple sensors allows for a more accurate measurement of displacement and orientation.

TOLERANCES

Figure 5:
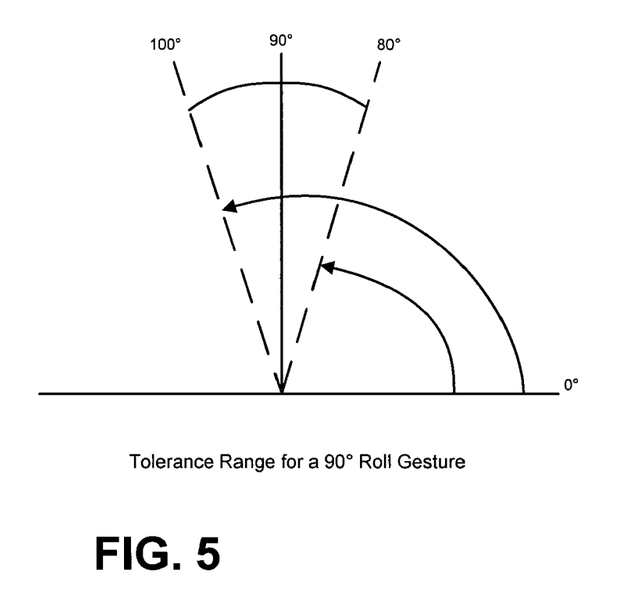
FIG. 5 is a diagram of a tolerance range for a 90° roll gesture used during authentication.

FIG. 5 is a diagram of a tolerance range for a 90° roll gesture established during authentication setup and used during authentication mode. Here, the tolerance range is between 100° and 80°, resulting in a 10° allowance for a user attempting to perform a 90° roll gesture, in one embodiment. This tolerance range may be established during authentication setup in different ways. For example, the user may have attempted a 90° roll gesture many times and the recorded angle of each attempted gesture always fell within the range of 80° to 100°. Or, the gesture was only performed once and a tolerance range of 20° was established by default or by input from the user. Or, some of the attempted gestures were less than 80° and some of the gestures were more than 100°, but the application used an algorithm that has limited the tolerance range to 20°.

During authentication mode, assume that the stored gesture data indicates a roll gesture of 90° used for authentication. This embodiment permits the user to rotate the device left to right as a roll rotation around the longitudinal axis 410 during authentication mode within the established tolerance range. If the device is tilted beyond 10 degrees from the targeted 90 degrees, then authentication will fail during authentication mode because the roll gesture would not fall within the accepted 80 degree to 100 degree tolerance range in this example. But, if the user performs a roll gesture with the device during authentication mode and the roll gesture stops at an angle of between 80° and 100°, then authentication will succeed.

Of course, any gestures performed about the other axes (including the vertical axis 430 and lateral axis 420) may be used instead or in addition to movement about the longitudinal axis and there may be a different tolerance range associated with movement about each of these axes. For example, a tolerance range of 5° may be accepted for a 90° yaw rotation on the vertical axis 430. In another example, a tolerance range of 20° for both a targeted 90° yaw gesture and a 90° roll gesture may be accepted. Also, a narrower or wider tolerance range can be established by user input or by an application selecting predefined default values in step 304 of FIG. 3. And, a tolerance may be established for a movement along an axis as well as for a change in orientation about an axis (e.g., a gesture is movement up about ten inches, with a tolerance of plus or minus two inches).

As used herein, the term "tolerance range" refers to a range in which any value is deemed to be a match with a target value; in this example, the tolerance range is 80° to 100°. The term "tolerance" refers to how far off a value may be from a target value yet still be considered a match; in this example, the tolerance for a targeted 90° roll gesture is 10°.

AUTHENTICATION MODE

Figure 6:
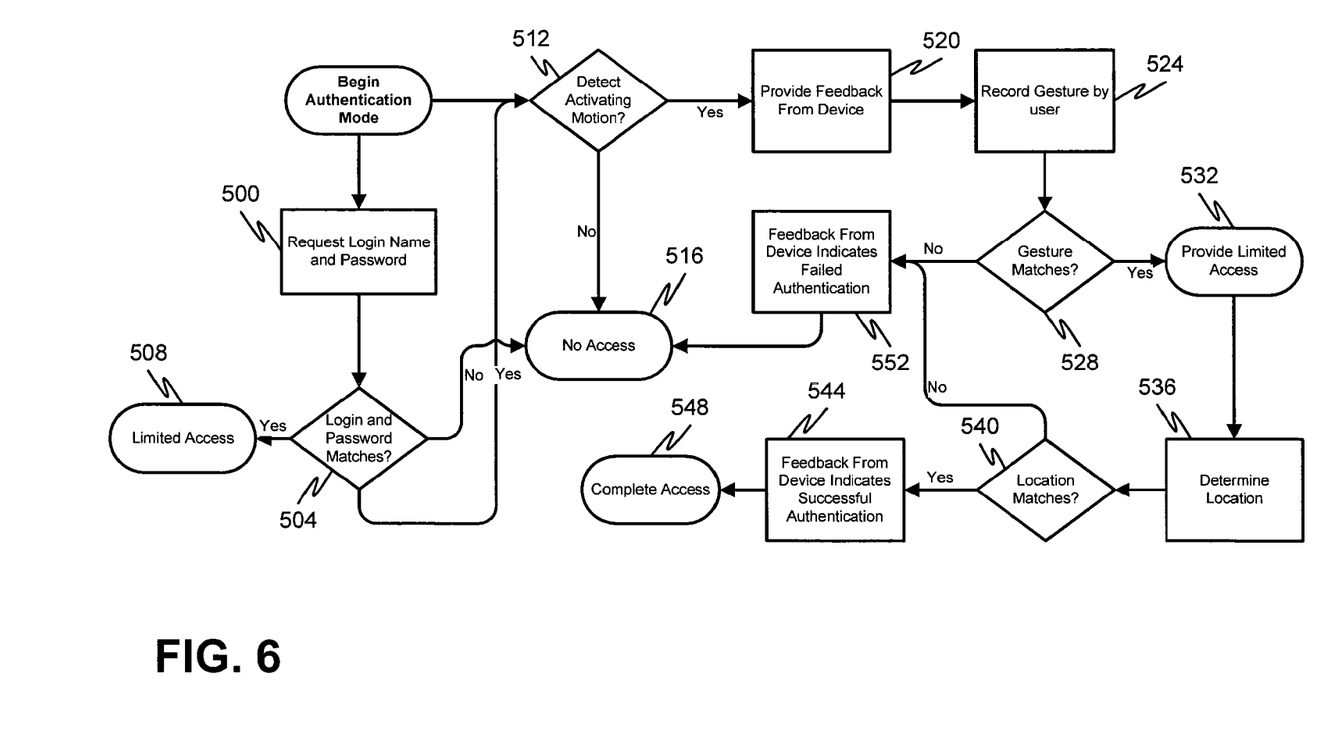
FIG. 6 is a flow diagram describing one embodiment in which a mobile device is in authentication mode.

FIG. 6 is a flow diagram describing one embodiment in which a mobile device is in authentication mode. There are two methods of beginning authentication mode. The first step may begin at 500 with a login name and password as known in the art or at step 512 by detecting an activating motion. Steps 500 to 508 are known in the art, and one of skill in the art will appreciate that other authentication techniques may be implemented within the scope of the present invention in order to authenticate the user to the mobile device. Additionally, steps 500 and 504 may be used to provide another layer of security to the mobile device by requiring the user to authenticate the mobile device at steps 500 and 504 before continuing to step 512 for further authentication.

If step 500 is required by the owner of the mobile device to authenticate the user, then the user is prompted on the screen 70 of the mobile device to input a login name and password. The user will input the login name and password on a key input region 90 to authenticate the user. After the mobile device determines whether the login and password matches the stored data at step 504, no access will be permitted in step 516 if the login and password do not match. The owner of the mobile device may require the login password to be authenticated by the user as a first step before proceeding to step 512, in which a predetermined activating motion is performed by the user. In another embodiment, limited access to the mobile device will be allowed in step 508 if the login and password match.

Although not shown in FIG. 6, the mobile device establishes any activating motion previously input by the user or previously determined by an application by selecting predefined default values. The purpose of the activating motion is to inform the mobile device that the user is ready to perform a previously stored authentication gesture once the device provides feedback indicating the device is ready for the gesture to be performed.

Examples of a predetermined activation motion are the following: any motions performed by the user with the mobile device in any direction in a predefined time frame (such as shaking the device four times in one second); twisting the device in a 360 degree yaw rotation; flipping the device for no less than about 10 seconds; holding the device close to the face (making use of the proximity sensor) or any other activating motion the user or application establishes. Establishing any default tolerance ranges is optional as the method may instead automatically determine tolerances for the activating motion as described above. A gyroscope 224, accelerometer 228, compass 232, and any other motion detecting sensors are used to detect the activating motion as well. Wide tolerance ranges may be used as predetermined defaults for the activating motion. For example, an activating motion may be accepted even though a user rotates the device 290 degrees instead of the targeted 360 degrees motion. The purpose of the activating motion is to signal to the system that it needs to be ready for the authentication gesture. As such, the activating motion should be simple and easy to recognize. It may use only the sensors appropriate for the given motion. (By minimizing the passive sensor use in detecting an activation, use of device resources will be minimized.) The device may wait for the activation motion continuously, or only under certain conditions (For example, it may only wait when a certain application is running or only when a certain point is reached in an application.) In some cases, the activation motion will not be needed as gesture entry is implicit in the current state of the application. (For example, after entering a user name and password, the user will enter an authentication gesture.)

In one embodiment, the activating motion does not need to be input or performed ahead of time by the user. For example, the user may simply be instructed (or know) that the activating motion is "a vigorous shake." Or, the user may be informed that the activating motion is to simply drop the device into the palm of his or her hand from a distance of one foot.

The mobile device will prompt the user to perform an activating motion in step 512 by sound notification with a speaker 252. However, the mobile device may prompt the user by vibration with a vibrating alert motor 208 or by a message displayed on the screen 70 to begin performing an activating motion, or by using any other suitable output. The user may be instructed to perform an activating motion for a predetermined number of seconds. It is also contemplated that the device does not need to prompt the user to perform an activating motion; the user may simply perform the activating motion. In addition, it should be noted that the activating motion need not be a motion at all but may be any suitable input from the user to the mobile device. For example, the user may press a button on the device, swipe a finger, speak a phrase, etc., in order to achieve the same effect as performing a true activating motion, namely, letting the device know that the user is ready.

If the mobile device fails to detect an activating motion by the user, then no access is allowed to the mobile device in step 516. Feedback from the mobile device will be provided to the user in step 520 if the predetermined activating motion is detected by the device at step 512. The user will receive feedback from the mobile device that an activating motion was detected (and that the device is ready for the gesture to be performed) by sound notification with a speaker 252. Other methods to prompt the user that an activating motion was detected are feedback by vibration with a vibrating alert motor 208 or by a message displayed on the screen 70, as well as other methods of output from a mobile device.

At step 524, gesture or gestures performed by the user with the mobile device are recorded. Preferably, the user performs the same gesture that he or she had performed in step 320 in order to authenticate himself or herself to the mobile device. As mentioned above, the gyroscope 224, accelerometer 228, compass 232, and any other sensors (such as the magnetometer 236 and magnetic field sensor 240) that detect and record movement are used to record gesture performance. All the varying methods of recording a gesture or gestures stated previously in FIGS. 3, 4, and 5 are used, which includes recording movement about at least one axis or recording displacement along at least one axis, or both. Completion of the gesture may be determined in different fashions. Examples of completing gesture recording include the following: recording all gestures in a time frame of no more than about 3 seconds; stopping recording when the mobile device detects no movement by the user for about 2 seconds; or discontinuing recording gestures once the device returns to the initial position of the gesture. A notification is provided to the user by sound notification with a speaker 252 that gesture recording is completed in one embodiment, whereas, notification to the user may also include a vibration with a vibrating alert motor 208 or by a message displayed on the screen 70 that gesture recording is completed, as well as by other output means.

Data from the recorded gesture or gestures performed in the preceding step will be compared against stored gesture performance data from the authentication setup at step 528. If any tolerances or tolerance ranges are associated with components of the stored gesture performance data, then the recorded gesture or gestures are compared to see if they fall within those tolerances or tolerance ranges. If the recorded gesture or gestures data does not match the stored gesture performance data, then the mobile device will provide feedback to the user that authentication failed in step 552. Sound notification with a speaker 252 that the authentication failed from the mobile device is provided to the user. The mobile device feedback to the user may be a vibration with a vibrating alert motor 208 or by a message displayed on the screen 70 indicating authentication failed. (In some cases, no direct feedback would be provided. The only "feedback" sent to the user would be the limited access.) Then, in step 516, no access will be authorized by the owner as authentication failed. While the recorded gestures may not match against the stored gesture performance data, the user may reattempt authentication from the beginning or from the failed authentication step if permitted by the owner of the device according to predefined defaults. Depending on the application, the user may have the ability to easily re-attempt the gesture by performing the activating motion or by clicking on a button.

If, however, the recorded gesture or gestures matches the stored gesture performance data, then the user is permitted limited access to the mobile device in step 532, in one embodiment. As mentioned above, while matching gesture performance against stored gesture data, the recorded data is allowed to fall within any determined tolerance ranges. Alternatively, limited access is not an option and the user will be allowed complete access or no access. In this alternative situation step 528 proceeds directly to step 536.

At step 536, the geographic location of the mobile device is recorded with the GPS 244. Other sensors or software methods (such as cell network triangulation or internet protocol address) may be used to determine the location of the mobile device. Recorded geographic location data is compared against stored geographic location data from the authentication setup for step 540. As mentioned, the recorded geographic location data is allowed to be within any determined tolerance range. If the recorded geographic location does not match against the stored geographic location data, then authentication will fail and step 552 follows as described above. If for any reason, the GPS 244 is not properly detecting the location (as weather may affect the accuracy), then the user may reattempt authentication from the beginning or from the last failed step if permitted by the owner of the mobile device, as an example. If the accuracy of the device is low, or it is having difficulty obtaining geographic location information, the user may have the option of waiting longer to obtain location information. The total allowed wait time can be configured or limited as part of the system set up.

Feedback to indicate to the user that authentication is successful in step 544 is given if the recorded geographic location data matches the stored geographic location data from FIG. 3. As discussed above, the user is then notified by sound with a speaker 252, vibration with a vibrating alert motor 208, a message displayed on the screen 70 that authentication is successful, or by using other alerting methods.

Lastly, in step 548, the user is allowed complete access to the mobile device by virtue of the successful authentication. For example, the highest level of access to data on the mobile device may be provided if the device is authenticated at the user's office. Only if the user (the employee) performs authentication at the office and the recorded data matches the stored geographic location, stored gesture performance data, and perhaps the login password then the employee will be authorized complete access to all company files on the mobile device at the office. By contrast, even though a gesture performed by the employee at home matches the stored gesture performance data, the employee will not be permitted to access all company files at home but may only be permitted to access work e-mail. As mentioned above, varying levels of security may be selected by the owner of the mobile device and may be implemented using the present invention.

Figure 7:
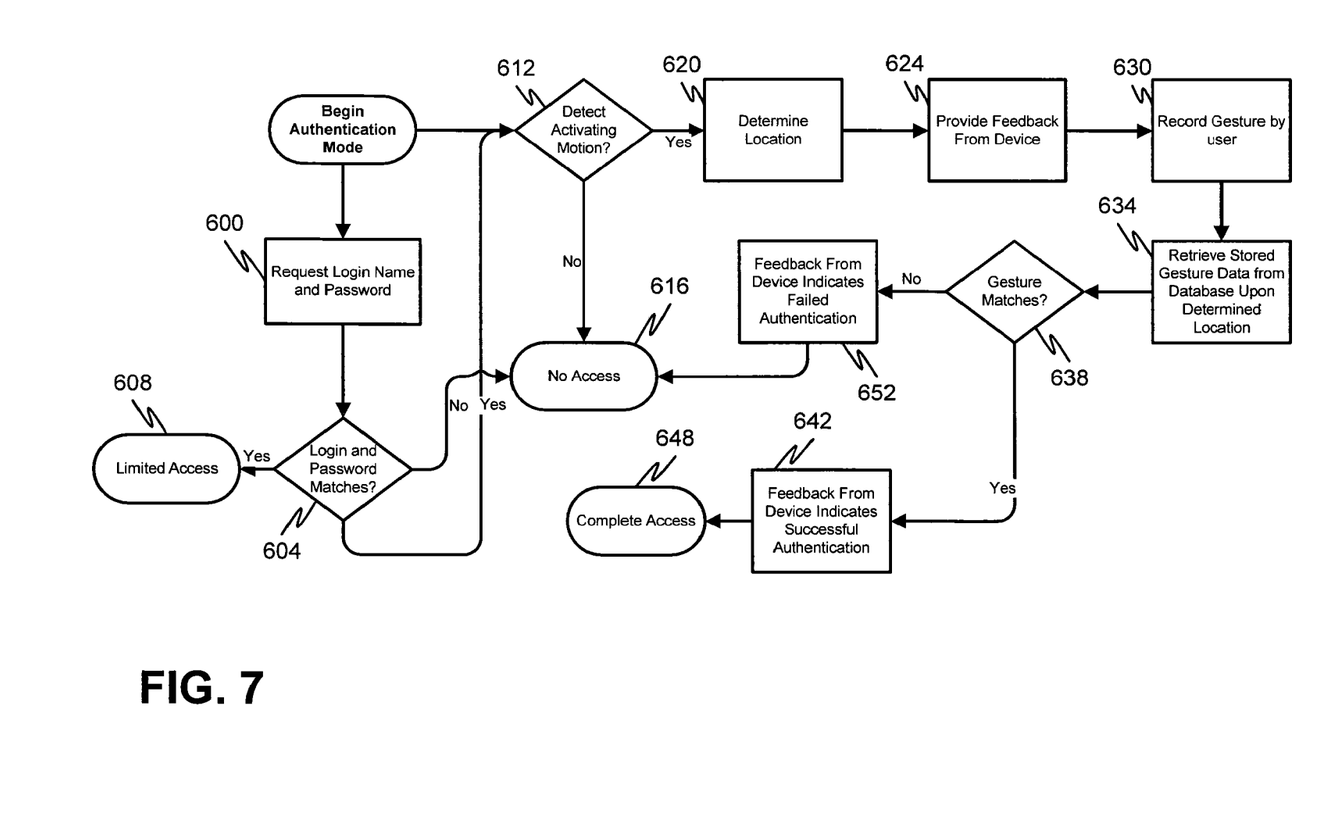
FIG. 7 is a flow diagram describing a second embodiment in which a mobile device is in authentication mode and the location is determined before matching gestures.

FIG. 7 is a flow diagram describing a second embodiment in which a mobile device is in authentication mode and the location is determined before matching gestures. As FIG. 7 is similar to FIG. 6, all steps that are the same in FIG. 6 are not described again; new steps are described below as well as a modification in the flow. Steps 600 to 608 are optional in this authentication process as well and are similar to steps 500 to 508. Determining the location of the mobile device first in order to retrieve the appropriate stored gesture from a database of the mobile device allows the gesture matching process to be more efficient and provides for different levels of access at different locations.

Assuming that an activating motion is detected in step 612 as in step 512, in step 620 the geographic location is determined as in aforementioned step 536. Location is determined first in this embodiment in contrast with FIG. 6 so that the mobile device's geographic location can be matched with a corresponding gesture or gestures. Determination of the location first allows the device to determine more efficiently which level of access is authorized according to gestures performed and recorded thereafter in step 630; an example is provided below at step 634. Step 624 may be performed in the same manner as step 520 and may even be performed before step 620, and again indicates to the user that the device is ready to record the user's gesture.

At step 630, recording a gesture performed by the user may be performed in a similar manner as in step 524. In step 634, the stored gesture data corresponding to the determined location from step 620 is retrieved from a suitable persistent storage database of the mobile device. In other words, the database may include many stored gestures, each stored gesture being associated with a particular location. In order to set up authentication, the user may have performed a first gesture at home, a second gesture at the office, and a third gesture at another location. The determined location is used as a key into this database in order to retrieve the stored gesture data corresponding to the determined location. In one specific example, if the determined location is the user's office, this location is used to retrieve the stored gesture that the user had previously performed at his or her office during authentication setup. In this fashion, extra security is provided because not only must the mobile device be in the correct location, but the correct gesture must also be performed. It is also possible that the same gesture is performed at different locations. In the case of complex gestures, gesture matching can be made more efficient if the correct gesture specific to a particular location is retrieved first before any matching is attempted.

In a variation of this embodiment, a location may have different gestures associated with it in order to allow varying security access levels. For example, the user may perform authentication setup three different times at his or her office, each time using a different gesture and specifying a different application or level of security. The gesture of lifting and lowering the device at the user's office may only provide access to the Internet. A gesture of moving the device from side to side may allow access to the Internet and to electronic mail, while the more complex gesture of rotating and tilting the device may allow complete access to information on the mobile device. In this embodiment, retrieval of stored gesture data in step 634 would retrieve the data associated with three different gestures for the same location.

In a different embodiment, the same gesture performed at different locations provides different results. For example, an employee is allowed full access to all company files at the office if a 90° yaw rotation is performed. Meanwhile, that employee may be permitted access to work e-mail and the company's intranet at home if a 90° yaw rotation is performed. If the employee instead performs a 90° yaw rotation at the user's regularly visited gym, then the employee may be allowed access to only work e-mail. Though the gesture is identical in each example, the location determines the level of access permitted. In this embodiment, retrieval of stored gesture data in step 634 would retrieve the same gesture data for each of the three different locations.

As in step 528, the mobile device determines whether the stored gesture data matches the gesture performed by the user in step 638. If the recorded gesture from step 630 does not match, then failed authentication feedback is provided in step 652 as in step 552. No access to the mobile device is then permitted in step 616 as in the 516 step.

If the gestures do match in step 638 then feedback of authentication is provided to the user of the mobile device in step 642 as in step 544. Thus, complete access in step 648 is authorized much as in step 548.

COMPUTER SYSTEM EMBODIMENT

Figure 8A:
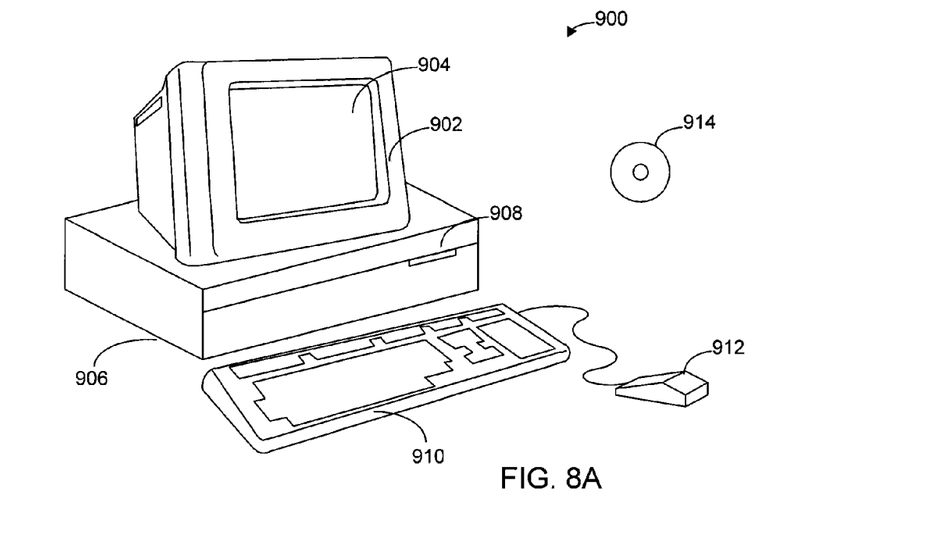
FIGS. 8A and 8B illustrate a computer system 900 suitable for implementing embodiments of the present invention.
Figure 8B:
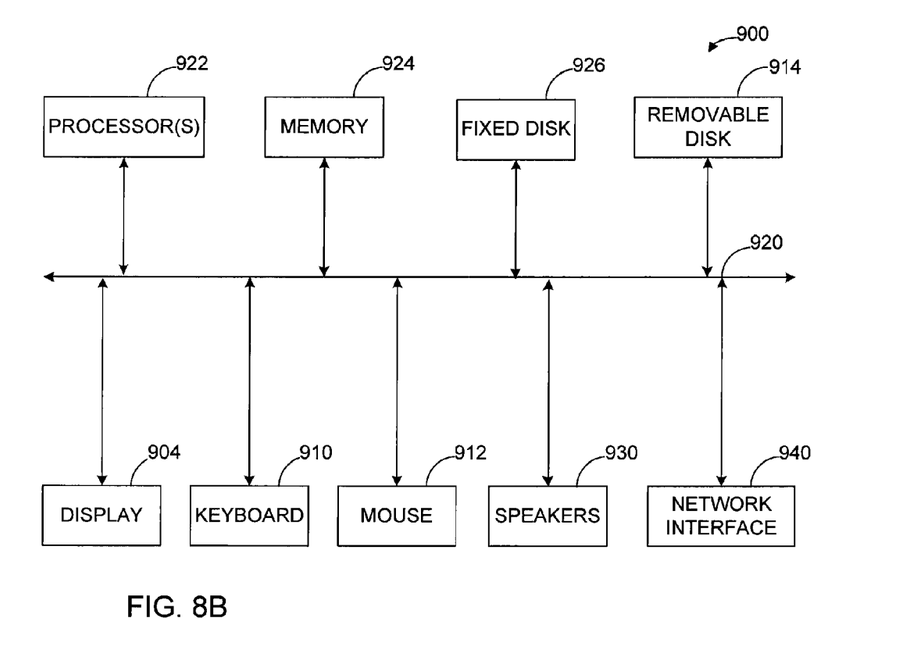

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of determining authentication information on a mobile device, said method comprising:
   prompting a user to perform a gesture with said mobile device, wherein the user is prompted to perform the gesture multiple times;
   recording a geographic location of said mobile device proximate in time of each instance when the user performs the gesture multiple times;
   detecting, using at least one sensor of said mobile device, a plurality of movements of said mobile device caused by said user performing said gesture multiple times with said mobile device at the recorded geographic location;
   recording, during said movements, a plurality of data sets describing said movements, each data set describing one of said movements when said gesture is performed;
   determining a tolerance range of said gesture based upon differences between said plurality of data sets, wherein the tolerance range of said gesture is customized based on an accuracy of the user performing said gesture multiple times;
   determining a single set of data from said plurality of data sets as describing said gesture;
   determining a geographic tolerance range for said geographic location; and
   storing said single set of data describing said gesture together with said recorded geographic location and said geographic tolerance range and said gesture tolerance range as said authentication information in persistent storage of said mobile device.

2. The method as recited in claim 1 wherein each of said movements begins with said mobile device being oriented in an initial position in three dimensions and each of said movements ends with said mobile device being oriented in said initial position, said method further comprising:
   said mobile device detecting non-movement of said mobile device in said initial position for a predetermined number of seconds as indicating the end of each of said movements.

3. The method as recited in claim 1 wherein said movement of said mobile device includes a change in orientation of said mobile device and a change in displacement of said mobile device caused by said user.

4. A method of authenticating a user on a mobile device, said method comprising:
   performing a setup procedure including:
      prompting the user to perform a gesture with said mobile device, wherein the user is prompted to perform the gesture multiple times;
      recording a geographic location of said mobile device proximate in time of each instance when the user performs the gesture multiple times;
      detecting, using at least one sensor of said mobile device, a plurality of movements of said mobile device caused by said user performing said gesture multiple times with said mobile device at the recorded geographic location;
      recording, during said movements, a plurality of data sets describing said movements, each data set describing one of said movements when said gesture is performed;
      determining a tolerance range of said gesture based upon differences between said plurality of data sets, wherein the tolerance range of said gesture is customized based on an accuracy of the user performing said gesture multiple times;
      determining a single set of data from said plurality of data sets as describing said gesture;
      determining a geographic tolerance range for said geographic location; and
      storing said single set of data describing said gesture together with said recorded geographic location and said geographic tolerance range and said gesture tolerance range as authentication information in persistent storage of said mobile device; and
   authenticating the user on the mobile device, including:
      outputting, from said mobile device, a signal indicating that said mobile device is ready to begin authentication;
      detecting after said outputting, using at least one sensor of said mobile device, a movement of said mobile device caused by said user performing the gesture with said mobile device;

recording, during said movement, current data describing said movement associated with said gesture;

recording a geographic location of said mobile corresponding to a time when said current data describing said movement is detected to generate a recorded geographic location;

retrieving from persistent storage of said mobile device the authentication information;

determining whether said current data matches the single set of data within said allowed gesture tolerance range;

determining whether the recorded geographic location of said mobile device matches the stored geographic location associated with said gesture within the geographic tolerance range; and taking an action on said mobile device in response to detecting a match for both the gesture and the geographic location.

5. The method as recited in claim 4 further comprising:

detecting an input on said mobile device by said user to activate said mobile device for authentication;

determining whether said input data matches stored data, said stored data describing said input; and outputting said signal from said mobile device only when it is determined that said input data matches said stored data.

6. The method as recited in claim 4 wherein said movement of said mobile device includes a change in orientation of said mobile device and a change in displacement of said mobile device caused by said user.

7. The method as recited in claim 4 wherein said taking an action includes authenticating said user to said mobile device or authenticating said user to a software application of said mobile device.

8. A method of authenticating a user on a mobile device, said method comprising:

performing a first setup procedure to generate a first set of authentication information including:

prompting the user to perform a first gesture with said mobile device, wherein the user is prompted to perform the first gesture multiple times in a first geographic location;

detecting, using at least one sensor of said mobile device, a plurality of movements of said mobile device caused by said user performing said first gesture multiple times with said mobile device at the first geographic location;

recording, during said movements, a plurality of data sets describing said movements, each data set describing one of said movements when said first gesture is performed;

determining a tolerance range of said first gesture based upon differences between said plurality of data sets, wherein the tolerance range of said first gesture is customized based on an accuracy of the user performing said first gesture multiple times;

determining a first single set of data from said plurality of data sets as describing said first gesture;

determining a first geographic location and a first geographic tolerance range customized based on recording the geographic location each time the user performed said first gesture multiple times;

storing said first single set of data describing said first gesture together with said first geographic location, said first geographic tolerance range and said first gesture tolerance range as first authentication information in persistent storage of said mobile device; and performing a second setup procedure to generate a second set of authentication information including:

prompting the user to perform a second gesture with said mobile device, wherein the user is prompted to perform the second gesture multiple times in a second geographic location;

detecting, using at least one sensor of said mobile device, a plurality of movements of said mobile device caused by said user performing said second gesture multiple times with said mobile device at the second geographic location;

recording, during said movements, a plurality of second data sets describing said movements, each data set describing one of said movements when said second gesture is performed;

determining a second tolerance range of said second gesture based upon differences between said second plurality of data sets, wherein the tolerance range of said second gesture is customized based on an accuracy of the user performing said second gesture multiple times;

determining a second single set of data from said plurality of data sets as describing said gesture;

determining a second geographic location and a second geographic tolerance range customized based on recording the geographic location each time the user performed said second gesture multiple times and storing said second single set of data describing said gesture together with said second geographic location, said second geographic tolerance range and said second gesture tolerance range as second authentication information in persistent storage of said mobile device; and authentication the user on the mobile device, including:

associating a first set of access privileges with said first gesture and said first location;

associating a second set of access privileges with said second gesture and said second location;

outputting, from said mobile device, a signal indicating that said mobile device is ready to begin authentication;

detecting after said outputting, using at least one sensor of said mobile device, a movement of said mobile device caused by said user performing a gesture with said mobile device;

recording, during said movement, current data describing said movement;

determining a geographic location of said mobile device during said movement;

using said determined geographic location as a key to select said first authentication information responsive to said determined geographic location being said first geographic location and to select said second authentication information responsive to said determined geographic location being said second geographic location;

retrieving from said persistent storage of said mobile device said selected authentication information;

determining whether said current data matches said selected authentication information within said allowed gesture tolerance range of said selected authentication information; and in response to a match authenticating said mobile device, providing access according to the access privileges associated with the selected set of authentication information.

9. The method as recited in claim 8 further comprising:

detecting an input on said mobile device by said user to activate said mobile device for authentication;

determining whether said input data matches stored data, said stored data describing said input; and outputting said signal from said mobile device only when it is determined that said input data matches said stored data.

10. The method as recited in claim 8 wherein said movement of said mobile device includes a change in orientation of said mobile device and a change in displacement of said mobile device caused by said user.

* * * * *